(12) United States Patent
Hamaekers et al.

(10) Patent No.: US 6,540,042 B2
(45) Date of Patent: Apr. 1, 2003

(54) BEARING SYSTEM FOR AN ENGINE-TRANSMISSION UNIT

(75) Inventors: Arno Hamaekers, Gorxheimertal (DE); Arnold Simuttis, Bad Kreuznach (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/824,379

(22) Filed: Apr. 2, 2001

(65) Prior Publication Data

US 2002/0005311 A1 Jan. 17, 2002

(30) Foreign Application Priority Data

Apr. 4, 2000 (DE) .......................................... 100 16 654

(51) Int. Cl.$^7$ ................................................. B60K 5/00
(52) U.S. Cl. ...................... 180/300; 180/297; 180/312; 267/140.12; 267/141
(58) Field of Search ............................ 267/140.12, 141, 267/292, 153; 180/297, 300, 312, 291, 292; 248/647, 638

(56) References Cited

U.S. PATENT DOCUMENTS

| | | | | |
|---|---|---|---|---|
| 4,449,603 A | * | 5/1984 | Langwieder et al. | 180/297 |
| 4,487,287 A | * | 12/1984 | Watanabe | 180/297 |
| 4,667,764 A | * | 5/1987 | Sawada et al. | 180/297 |
| 4,889,207 A | * | 12/1989 | von Broock | 180/291 |
| 5,035,397 A | * | 7/1991 | Yamada | 180/297 |
| 5,967,251 A | * | 10/1999 | Turl et al. | 180/297 |
| 6,155,372 A | * | 12/2000 | Hirasaka | 180/297 |

FOREIGN PATENT DOCUMENTS

| | | |
|---|---|---|
| DE | 37 45 115 | 1/1988 |
| DE | 38 08 762 | 9/1989 |
| DE | 40 09 995 | 9/1991 |
| DE | 197 10 091 | 10/1997 |
| EP | 0 818 340 | 1/1998 |
| JP | 61-188228 A | * 8/1986 |

* cited by examiner

Primary Examiner—Jack Lavinder
Assistant Examiner—Mariano Sy
(74) Attorney, Agent, or Firm—Kenyon & Kenyon

(57) ABSTRACT

A bearing system for an engine-transmission (motor-transmission) unit transversely installed in a vehicle body of a motor vehicle, includes a first bearing element positioned between the engine and the vehicle body, a second bearing element positioned between the engine or the transmission and the vehicle body, and a third bearing element positioned between the transmission and the vehicle body. The second bearing element is formed and positioned without a movable intermediate element at the engine or transmission and vehicle body so that torque forces of the engine-transmission unit, supported by the second bearing element, are introduced into the vehicle body substantially in the vehicle longitudinal direction and so that the second bearing element, in a first domain, which includes small excursions in the vehicle longitudinal direction about the static position of rest at standstill of the engine has a first spring rate, and in a second domain, which adjoins the first domain, and includes larger excursions in the vehicle longitudinal direction, has a second spring rate. The second spring rate is greater than the first spring rate.

27 Claims, 11 Drawing Sheets

BEARING SYSTEM FOR AN ENGINE-TRANSMISSION UNIT

FIELD OF THE INVENTION

The present invention relates to a bearing system for a transversely installed engine-transmission (motor-transmission) unit in the body of a motor vehicle, having a first bearing element arranged between the engine and the vehicle body, and having a second bearing element arranged between the engine or the transmission and the vehicle body, and having a third bearing element arranged between the transmission and the vehicle body.

BACKGROUND INFORMATION

Such a bearing system is described, for example, in European Published Patent Application No. 0 818 340.

In the conventional bearing system for engine-transmission units installed transversely in a vehicle, the second bearing element provided at the bottom of the engine has assigned to it a movable hinged support, which transmits forces essentially in the rod direction of the hinged support. The disadvantage of the bearing system described in European Published Patent Application No. 0 818 340 is that it requires a technically complicated construction of the individual bearing elements, and is therefore costly. In addition, hinged supports tend to cause undesirable rod resonances and thereby contribute to an increase in the noise level of the vehicle. In addition, the accommodation of hinged supports often results in problems with respect to construction space and crash safety.

SUMMARY

It is one object of the present invention to provide a bearing system for an engine transmission unit which minimizes the transmission of undesired vibrations to the vehicle body and which may be manufactured cost-effectively.

The above and other beneficial objects of the present invention are achieved by providing a bearing system in which the second bearing element is designed and arranged on the engine or transmission and the vehicle body, without a movable intermediate element, so that, through the second bearing element, supported torque forces of the engine transmission unit, are conducted, substantially in the longitudinal driving direction, to the vehicle body, and in which the second bearing element in a first domain, which encompasses small deflections in vehicle longitudinal direction about the static position of rest at standstill of the engine has a first spring rate, and in a second domain, which adjoins the first domain and encompasses larger deflections in the vehicle longitudinal direction, has a second spring rate, the second spring rate being greater than the first spring rate.

One advantage of the bearing system according to the present invention is, that because of the soft spring characteristic, during small deflections, idling vibrations may be isolated particularly well. Ideally, in this situation, the first spring rate may be almost zero, so that a loss effect results. By the second spring rate, greater in comparison to the first spring rate, load change impacts, in particular, can be effectively reduced. Therefore, the bearing system according to the present invention makes it possible to combine opposite and seemingly contradictory technical vibration requirements in one bearing system. The bearing system according to the present invention, which provides for conducting the torque forces of the engine-transmission unit substantially in or counter to the driving direction, achieves technical vibration advantages, which are based on the fact that vehicle bodies are relatively stiff in this direction, and thus are relatively insensitive to vibration. In addition, a limit stop may adjoin the region of the second spring rate.

According to a further aspect of the present invention, the second bearing element may be positioned below, i.e., vertically below, the first bearing element.

A particularly improved vibration isolation may be achieved by arranging the third bearing element in a position next to or on the torque-roll axis, and/or arranging the first bearing element in a position above the torque-roll axis. For this purpose, the torque-roll axis is defined as follows: If a very flexibly supported, rigid body is loaded with an vibrating torque parallel to one of its three main axes, this body will vibrate about this main axis. If the torque vector is not parallel to a main axis, this vector may be split into components parallel to the main axes. The individual components generate vibrations about the main axes, the vibrating amplitudes of which are functions of the primary mass moment of inertia and the components of the torque vector. The individual rotary vibrations are superimposed to one total vibration, the axis of rotation of which is generally parallel to neither the torque vector nor the main axes. The rotary vibration axis thus formed is referred to as the torque-roll axis.

According to one example embodiment of the present invention, a bearing system is provided in which the second bearing element includes a first anchoring part, and, relatively movable to this, a second anchoring part, at least one spring element acting between the first and the second anchoring part. The bearing element may be connected with the engine or the transmission and with the vehicle body, without movable elements such as hinged supports.

A particularly compact design is achieved when the second bearing element is a sleeve bearing, in which the second anchoring part encloses the first anchoring part at a radial clearance. Without substantial cost, this arrangement yields a stop function and crash safety.

Isolating the vibrations of the engine-transmission unit is improved further by the second bearing element having a first chamber filled with damping fluid and bounded by a first chamber wall, and a second chamber, separated from the first chamber by a second chamber wall connected to the first chamber via a passage, the volume of the first chamber being changed by a relative movement of the first and second anchoring part, so that damping fluid in the passage between the first and second chamber is moved.

According to a further aspect of the present invention, the first and/or the second chamber wall is formed as an elastic partition which, in the static position of rest at standstill of the engine, is arranged so that the volume of the first chamber is not changed during a relative movement of the first and second anchoring parts in the domain of small excursions about the static position of rest at standstill of the engine and so that, during a relative movement of the first and second anchoring parts in the domain of large excursions the volume of the first chamber is changed. In this manner, a release effect occurs with respect to damping in the second bearing element functioning as torque support, since hydraulic damping starts only when the excursions exceed a specific threshold value.

A construction that is particularly simple to produce as well as being compact is achieved by arranging the first and/or second chamber wall in the static position of rest at standstill of the engine at a clearance from the spring element. This clearance achieves that, at small excursions about the static position of rest, no changes in the volume of the first chamber, and, therefore, also no hydraulic damping are attained. If the excursions are larger and exceed the aforementioned clearance, changes in the volume of the first chamber, and consequently the desired damping, begin to occur.

Thus, spring rates, which are of different magnitudes in the domain of small and large excursions, may be achieved particularly advantageously in that, in the first and/or second chamber in particular, elastic bumpers are provided, which stop the relative movement between the first and second anchoring parts. In the domain of large excursions, the spring rates of the elastic bumpers are additive to the spring rates of the spring element. Very low dynamic stiffnesses may also be achieved by bridging the gap using rubber crosspieces and by providing large passages in the region of the outer connection of the spring element to the second anchoring part. Thus, a hydraulic quenching function may be achieved during idling, in which the support acts softer than in the static state.

A particularly improved isolation of vibrations may be achieved when a first, second and/or third bearing element is positioned at body locations having high stiffness, particularly in the region of the chassis attachment. These bearing elements may be fastened to the vehicle chassis or to a subframe of the body. All bearing elements may be connected to the engine-transmission unit and the vehicle body without movable intermediate elements.

In accordance with one cost-effectively manufactured example embodiment of the present invention, the engine-transmission unit is fastened to the vehicle body by exactly three bearing elements. The first, second and third bearing elements, according to the present invention, are sufficient in most cases for achieving a sufficient bearing system of the transversely installed engine-transmission unit, from a technical vibration aspect. In addiction to the three bearing elements, arranged and designed according to the present invention, one or more further bearing elements may be provided.

Furthermore, the first bearing element may be positioned at or adjacent to the upper end of the engine-transmission unit, and the second bearing element may be positioned at or adjacent to the lower end of the engine-transmission unit. In accordance with a clearance of these bearing elements, an improved vibration isolation may be achieved.

The first and the third bearing elements may be positioned so that the center of gravity of the engine-transmission unit is arranged below an imaginary connecting line between the first and the third bearing elements.

DETAILED DESCRIPTION

Figure 1:
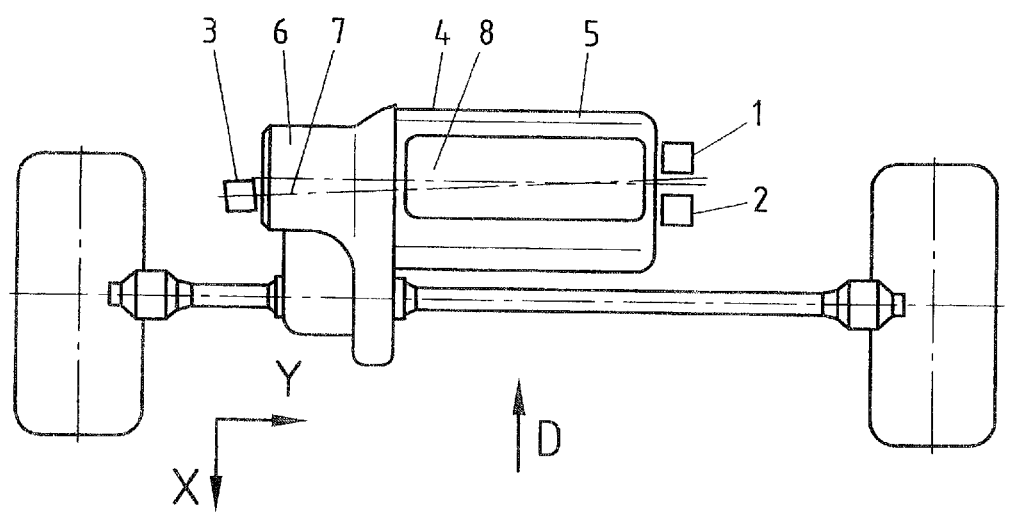
FIG. 1 is a top view of an engine bearing system according to the present invention.
Figure 2:
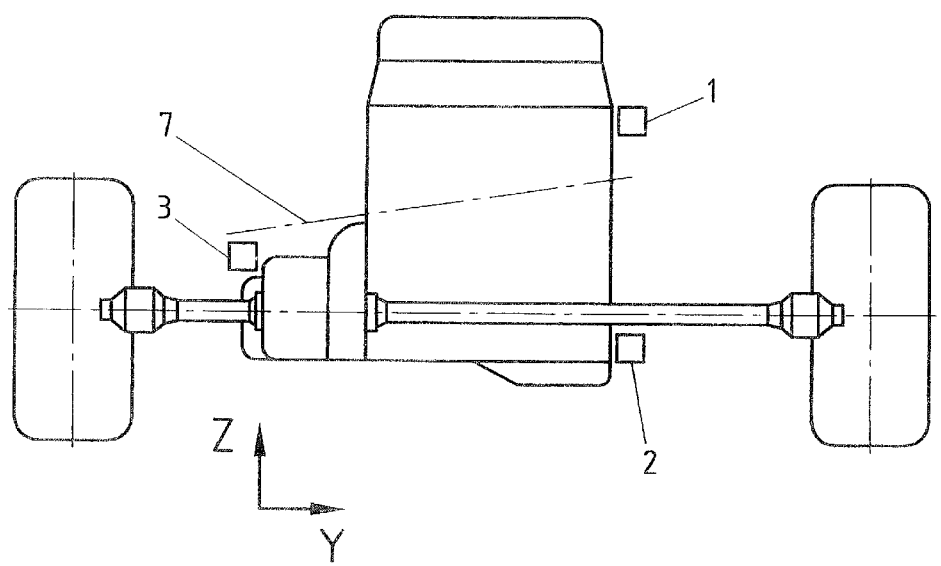
FIG. 2 is a rear view of an engine bearing system according to the present invention.
Figure 3:
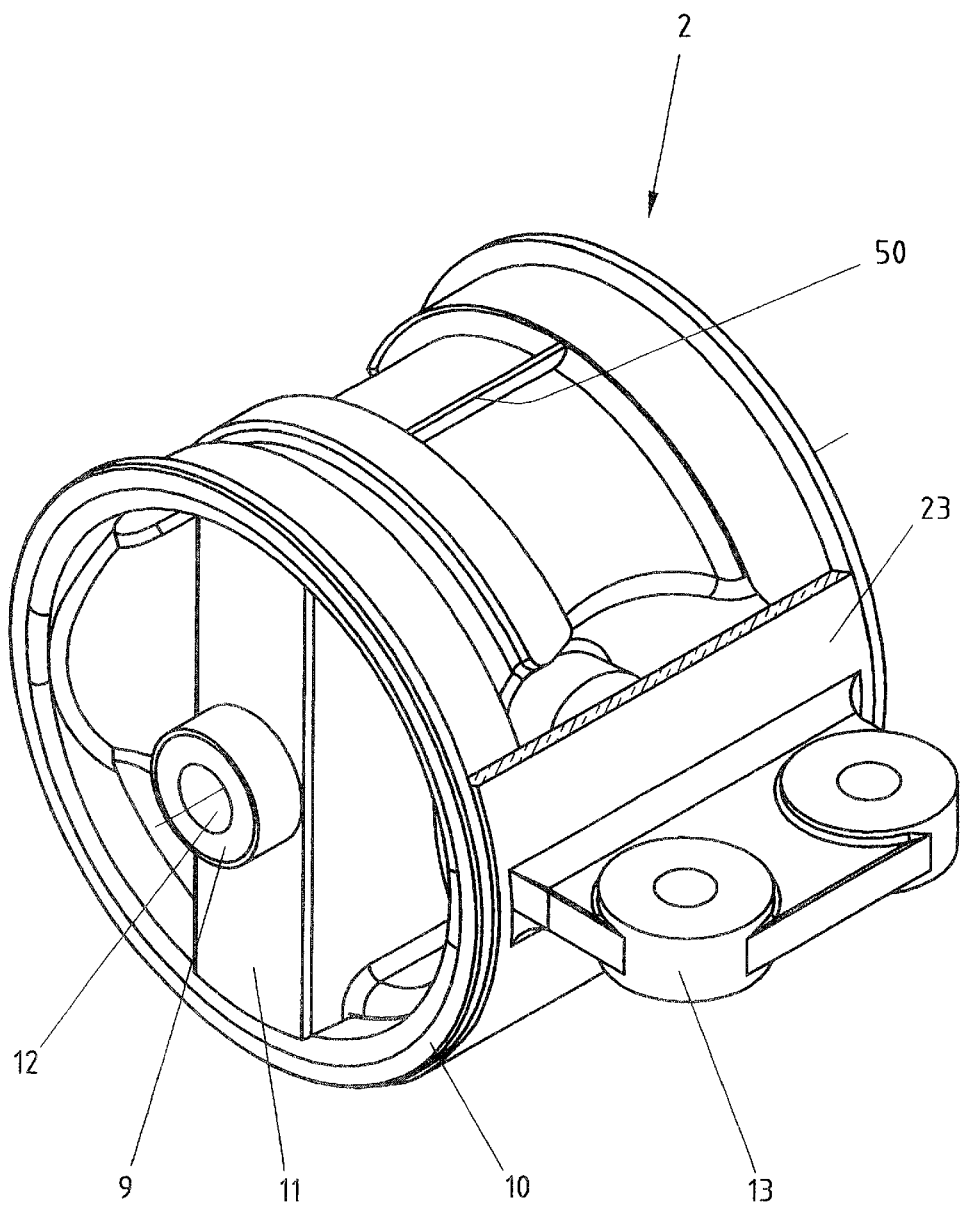
FIG. 3 is a perspective view of a bearing element, used as a second bearing element.
Figure 4:
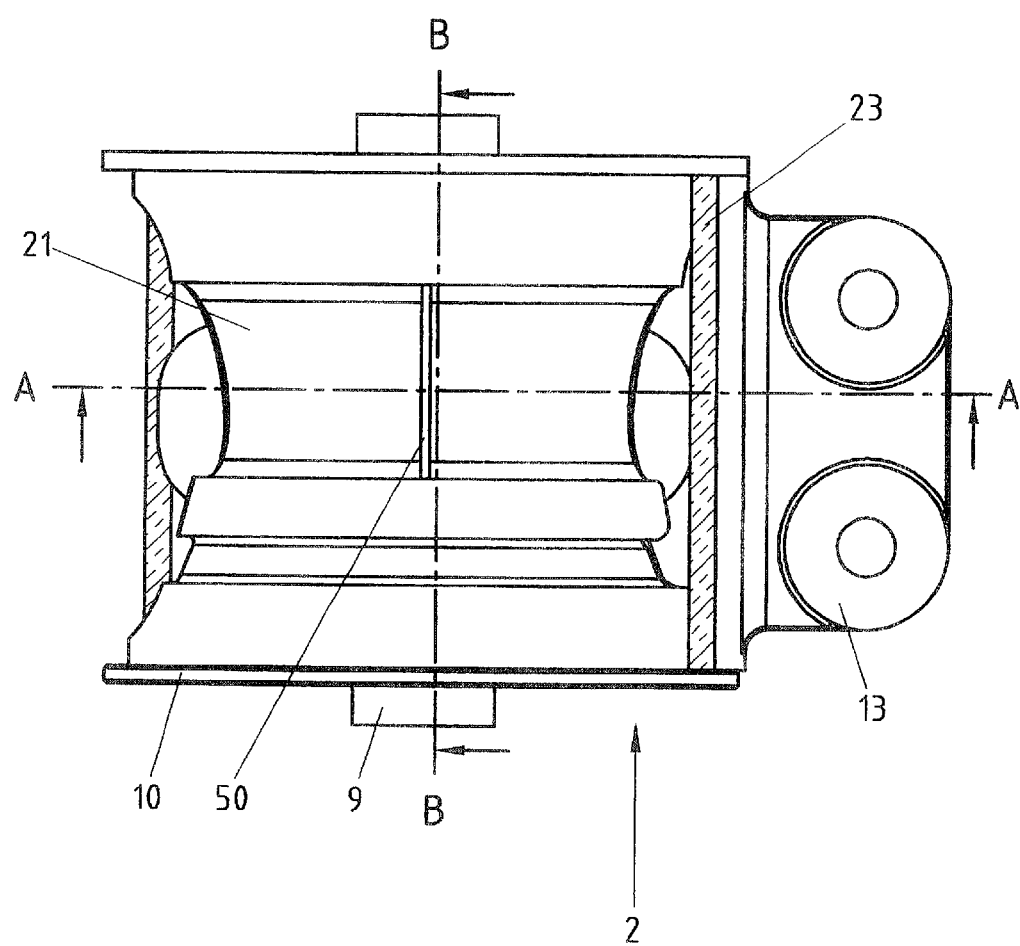
FIG. 4 is a top view of the bearing element illustrated in FIG. 3.
Figure 5:
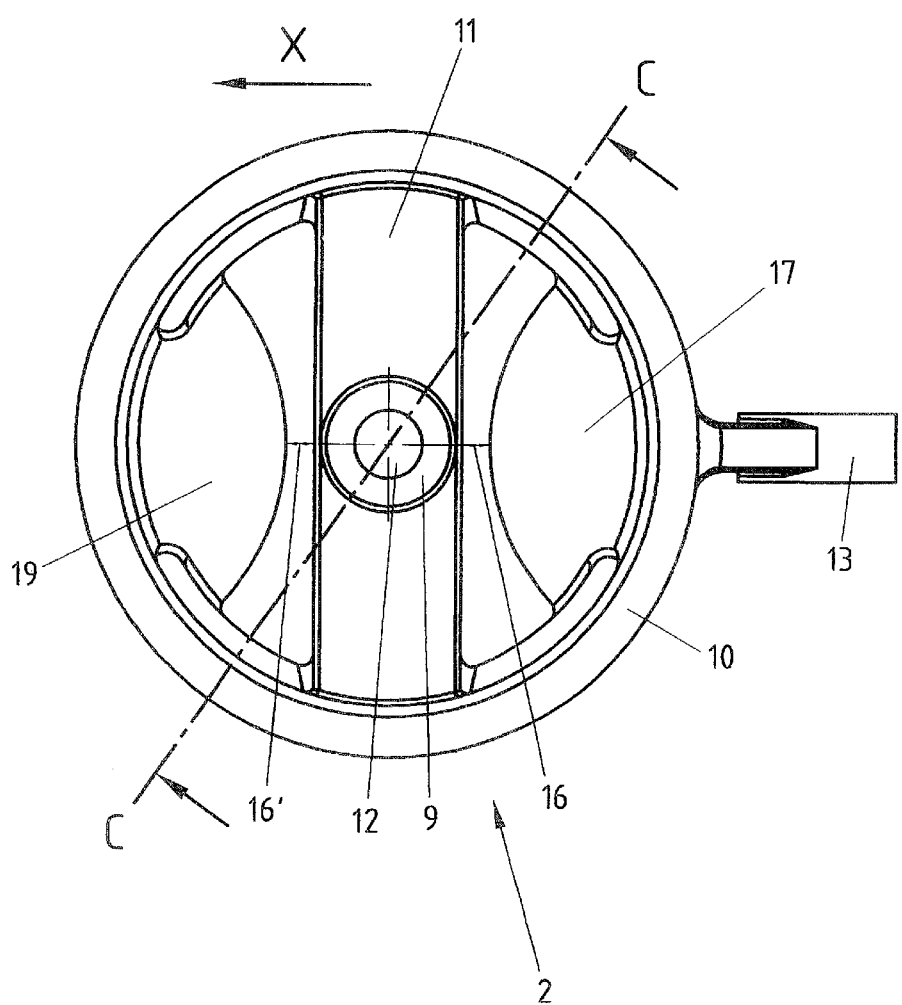
FIG. 5 is a front view of the bearing element illustrated in FIG. 3.

FIGS. 1 and 2 schematically illustrate the bearing system of an engine-transmission unit 4 on a vehicle body (not shown) of a motor vehicle. In these figures, the coordinates X, Y and Z denote the orientation in space. X points horizontally toward the rear, that is, counter to the driving direction, which is denoted as D. Y points horizontally to the right, as seen from the driving direction, while Z denotes the vertical direction.

The engine-transmission unit 4 includes the transversely installed engine 5 and transmission 6. The bearing system of engine-transmission unit 4 includes a first bearing element 1, which is positioned between engine 5 and the vehicle body, a second bearing element 2, which is positioned between engine 5 and the vehicle body, and a third bearing element 3, which is positioned between transmission 6 and the vehicle body. As illustrated in FIG. 2, the second bearing element 2 is positioned below the first bearing element 1, and the second bearing element 2 is positioned below the first bearing element 1, and the second bearing element 2 is arranged to be substantially vertically below the first bearing element 1. The first bearing element 1 is positioned above the torque-roll axis 7 of the engine. The third bearing element 3 is positioned adjacent to the torque-roll axis 7 or on the torque-roll axis 7 itself.

The second bearing element 2 may be positioned at a body location of the vehicle having a high stiffness, e.g., in the region of the chassis attachment. The body location may be, for example, the chassis itself or a subframe.

The second bearing element is positioned without a movable intermediate element on the engine or vehicle body and arranged so that torque forces of the engine-transmission unit 4, supported by the second bearing element 2, are conducted into the vehicle body substantially in the longitudinal direction of the vehicle, i.e., in or counter to direction X.

The second bearing element 2, illustrated in FIGS. 3 to 8, includes a first anchoring part 9 and a second anchoring part 10 movable relative to the first anchoring part 9, and a spring element 11 acting between the first and the second anchoring parts 9, 10. The second anchoring part may be formed as a sleeve bearing, the second anchoring part 10 enclosing the first anchoring part 9 at a radial distance. The first anchoring part 9 includes a bore hole 12 extending through the first anchoring part 9. By this bore hole 12, the second bearing element 2 may be connected to the engine 5 or the vehicle body. At the second anchoring part 10, a bearing flange 13, extending substantially in the radial direction, is provided by which the second anchoring part 10 may be connected to the vehicle body or the engine 5 of a motor vehicle.

The second bearing element 2 is formed so that in a first domain, which includes small excursions in the vehicle longitudinal direction (i.e., in or counter to direction X illustrated in FIG. 5) about the static position of rest at standstill of engine 5, it has a first spring rate, and in a second domain, which adjoins the first domain, and includes larger excursions in the vehicle longitudinal direction, it has a second spring rate, the second spring rate being larger than the first spring rate. According to the present invention, this arrangement is achieved in that the spring rate of the second bearing element 2 is determined in accordance with the first spring element 11, at small excursions about the static position of rest at standstill of the engine. The first spring element may have a spring rate in a range between 20 and 500 N/mm. A soft bearing system about a static position of rest is thus achieved. Raising the spring rate in the domain of greater excursions is attained by using the second spring elements 14, 14'. The second spring elements 14, 14', positioned opposite to each other, are arranged and formed so that they are only springily deformed when the relative motion between the first and second anchoring parts exceeds a certain amplitude. The second spring elements 14, 14' are only effective in this region of greater excursions, so that an increase in the spring rate, and consequently a harder bearing system characteristic result.

The first spring element 11 is formed as an elastomer element, which connects the first and the second anchoring elements 9, 10 to each other. The first spring element 11 is formed as a crosspiece which extends through the space enclosed by the second anchoring part 10. The first anchoring part 9, which is formed by a metal sleeve, is vulcanized into the first spring element 11. The first spring element extends substantially along a first plane 15, which is positioned substantially vertically.

Figure 6:
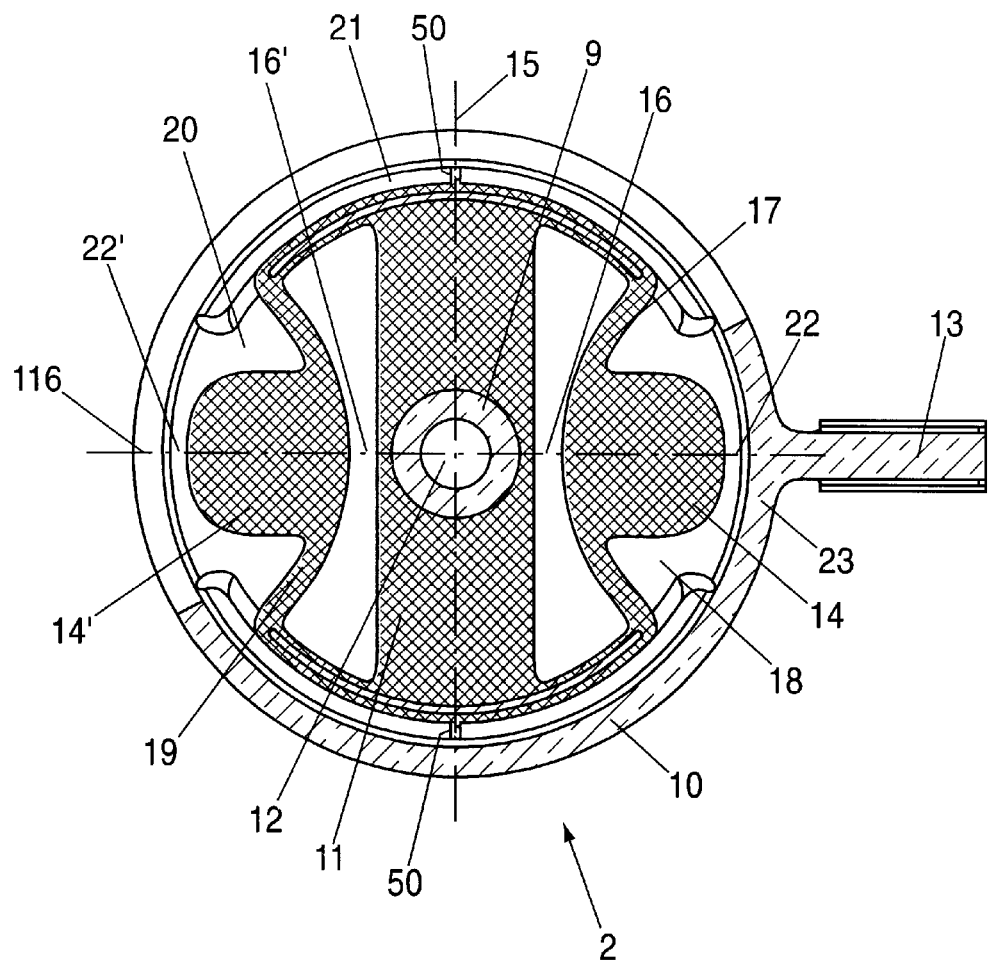
FIG. 6 is a cross-sectional view of the bearing element illustrated in FIG. 3 taken along the line A—A.
Figure 7:
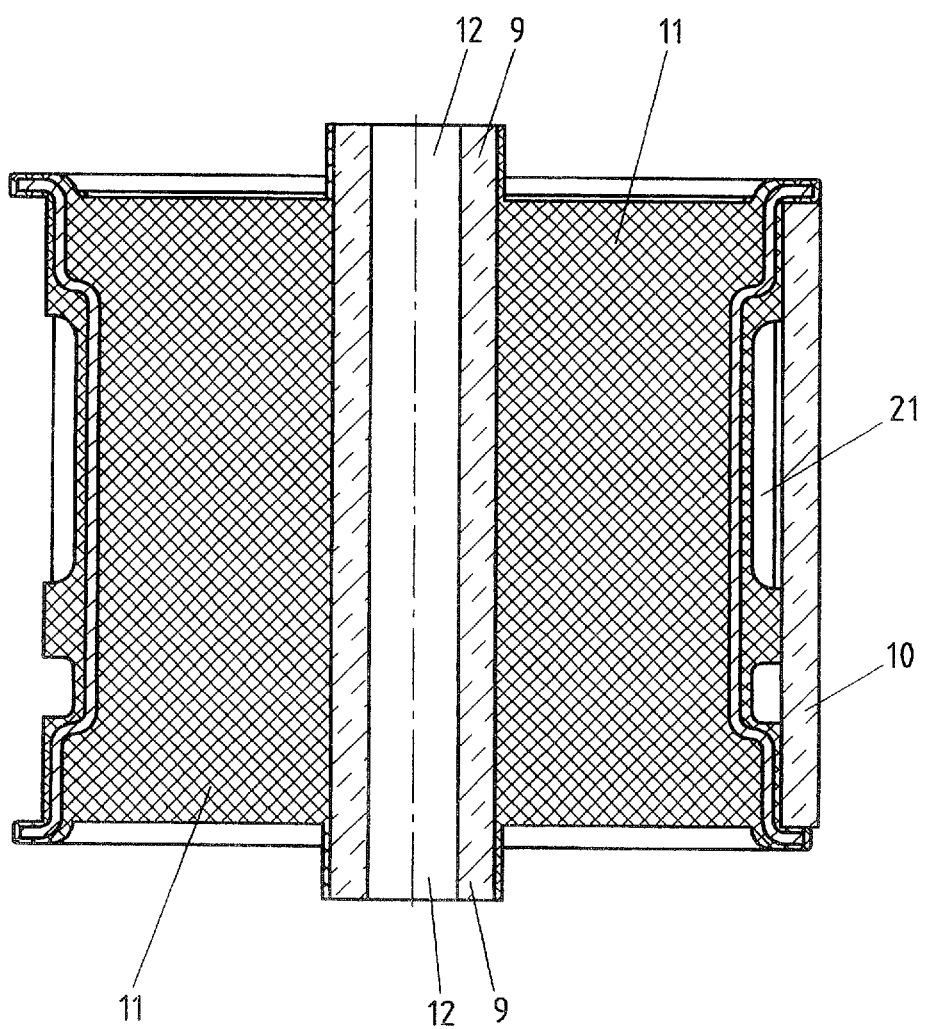
FIG. 7 is a cross-sectional view of the bearing element illustrated in FIG. 4 taken along the line B—B.
Figure 8:
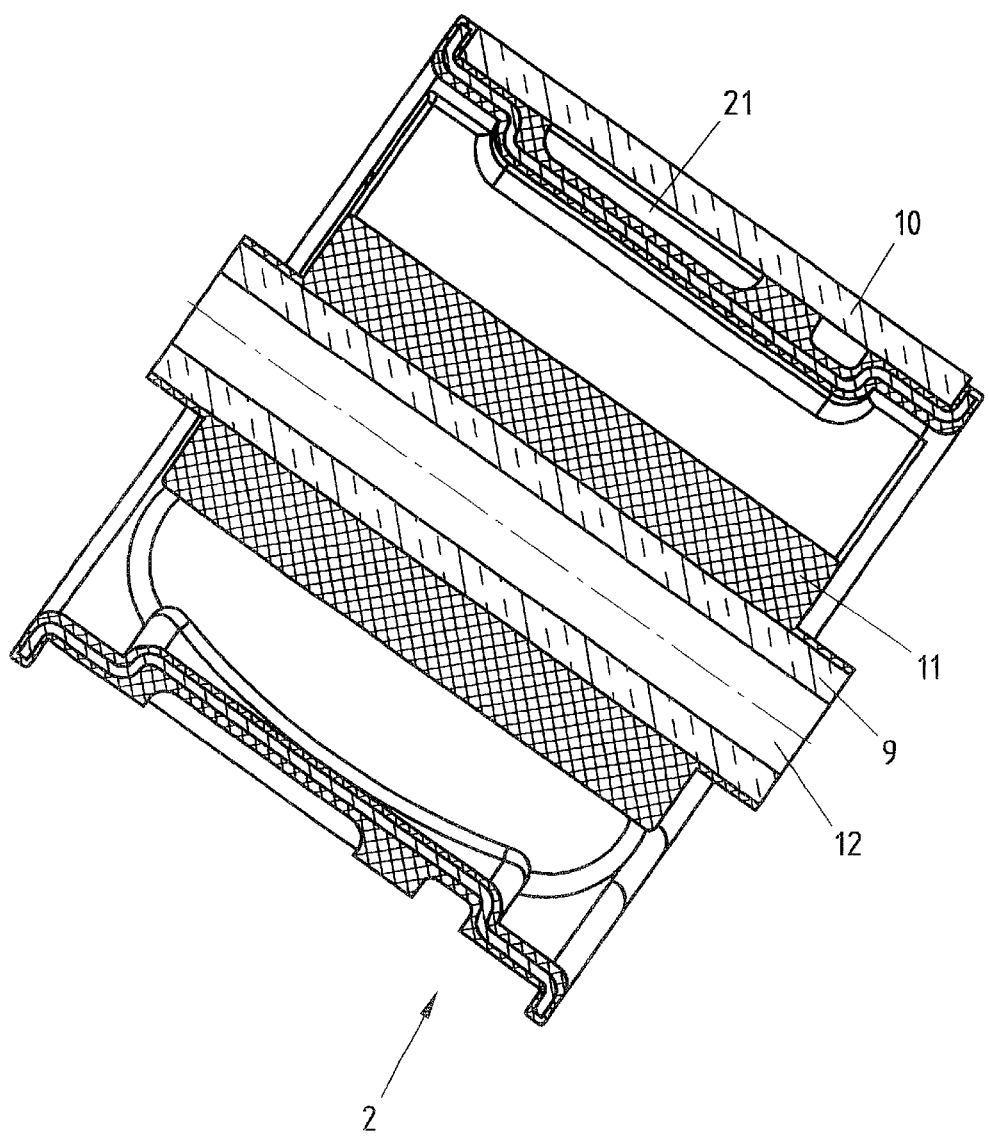
FIG. 8 is a cross-sectional view of the bearing element illustrated in FIG. 5 taken along the line C—C.

The second spring elements 14, 14' are positioned in the hollow space between the second anchoring part 10 and the first spring element 11. Like the first spring element 11, the second spring elements are made of an elastomer and are formed in one step. As illustrated in FIG. 6, each of spring elements 14, 14' is positioned, in particular symmetrically on each side to the first plane 15, in a second plane 116, which extends substantially perpendicularly to the first plane 15. Gaps 16, 16' are formed between the second spring element 14 or 14' and the first spring element 11. By this gap 16, 16' it is achieved, that, during excursions smaller than the gap 16, 16' the spring rate of the second bearing element 2 is determined substantially only by the first spring element 11. If the excursions exceed the magnitude of gap 16, 16', the second spring elements 14, 14' are moved, or deformed, so that their spring rate adds to the spring rate of the first spring element.

To avoid stressing the first and second chamber partitions 17, 19 during extremely violent engine movements from impact to impact, valves 50 may be provided in passage 21, particularly having a rubber lip vulcanized to the second anchoring part 10.

The second spring elements 14, 14' are formed as bumpers limiting the relative movement between the first and second anchoring parts 9, 10. The spring rates of the second spring elements 14, 14' increase with increasing deformation, so that, with increasing magnitude of the excursions, a further hardening of the second bearing element 2 occurs.

The second bearing element 2 includes a first chamber 18, filled with damping fluid and bounded by a first chamber partition 17, and a second chamber 20, separated from the first chamber 18 by a second chamber partition 19, the second chamber 20 being connected to the first chamber 18 by a passage 21, the volume of the first chamber 18 being changed by a relative movement of the first and second anchoring parts 9, 10, so that damping fluid is moved in passage 21 between first chamber 18 and second chamber 20. The first and/or second chamber partition 17, 19 are formed by an elastic barrier. This is made of elastomer and is formed in one operation in one piece with the first spring element 11 and the second spring element 14, 14'. The first and/or second chamber partition 17, 19 are arranged and formed so that at a relative movement of first and second anchoring parts 9, 10 in the domain of small excursions about the static position of rest at standstill of the engine 5, the volume of the first chamber is not changed. This is attained by the gap 16, 16' which is formed between chamber partitions 17 or 19, respectively, and the first spring element 11. During a relative movement of the first and second anchoring part 9, 10 in the domain of large excursions, however, the volume of first chamber 18 is changed. In the domain of greater excursions, hydraulic damping of the relative movements between the first and second anchoring parts occurs.

At the same time, the second spring elements 14, 14' are positioned in the first chamber 18 or the second chamber 20, respectively. Gaps 22, or 22' are provided between the second spring element 14 or 14' and the second anchoring part 10.

The passage 21 connecting the first and second chamber 18, 20 extends in the circumferential direction on the inside of the second anchoring part 10, and the passage 21 is positioned adjacent to the outer wall 23. A throttle valve, by which the flow resistance in passage 21 can be set to the desired value, is provided in the passage 21.

Figure 9:
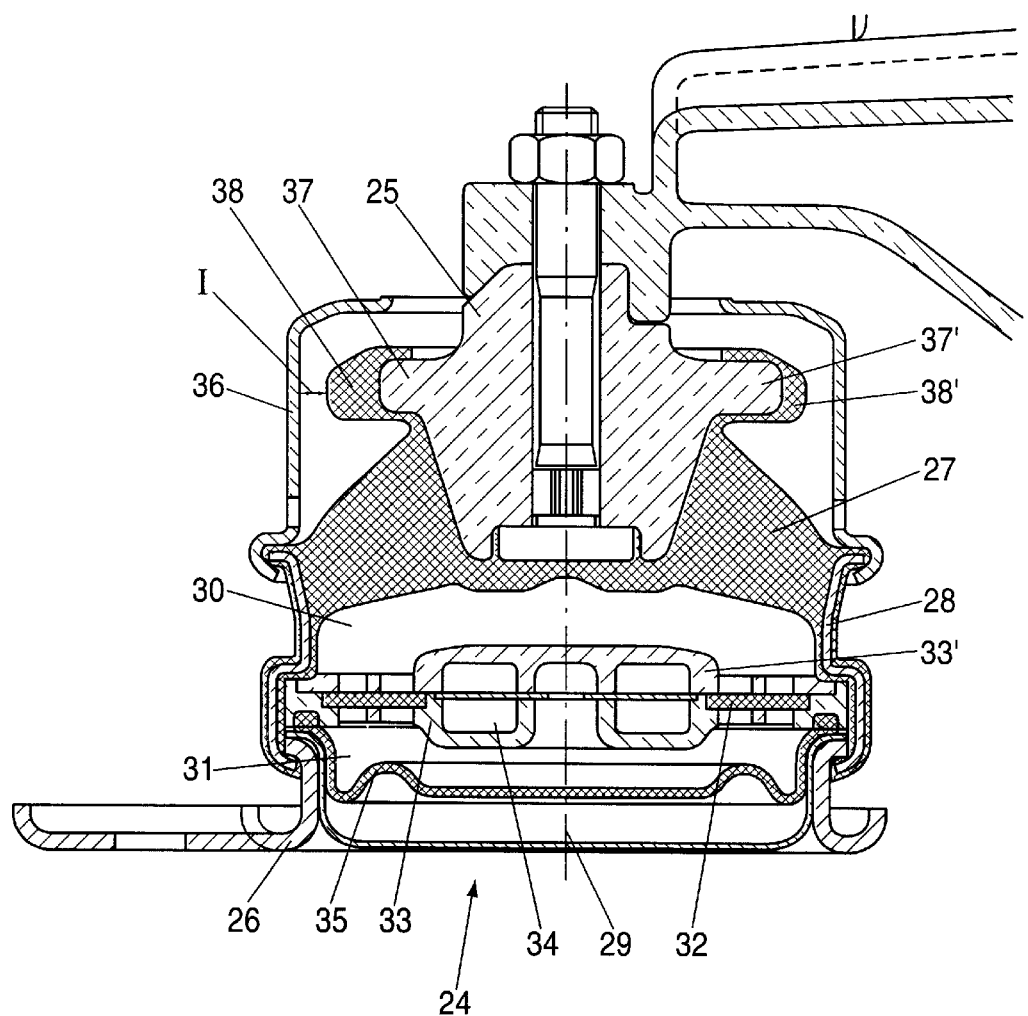
FIG. 9 is a cross-sectional view of a bearing element, which is used as a first and/or a third bearing element, according to the present invention.
Figure 10:
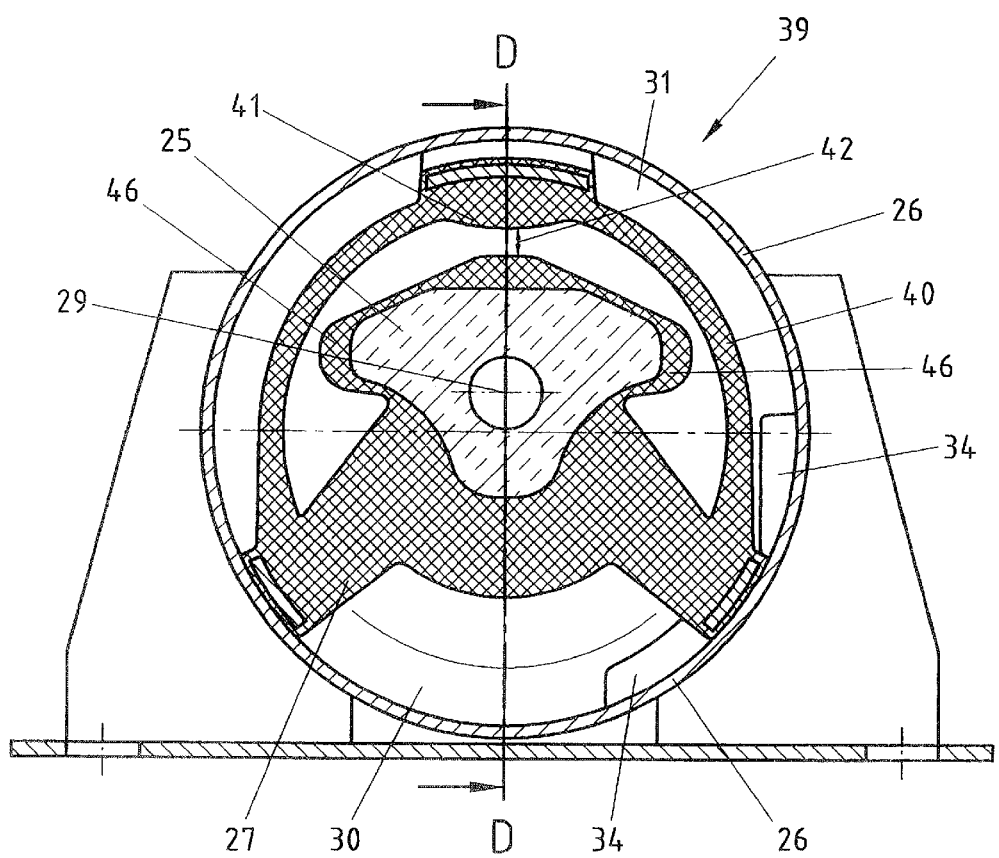
FIG. 10 is a cross-sectional view of another example embodiment of a bearing element which, according to the present invention, is used as a first and/or a third bearing element.

As illustrated in FIGS. 9 and 10, a first example embodiment of a hydraulically damping bearing system 24 is described, which, according to the present invention, may be installed as first bearing element 1 and/or third bearing element 3.

The bearing system 24 includes a first support element 25 and a second support element 26 movable with respect to the first support element 25. The bearing system may be connected, via the first and second support elements 25, 26 made of metal to the engine 5 or the transmission 6 and to the vehicle body.

Between the first support element 25 and the second support element 26 a spring element 27 is provided, which is formed as a rubber body. The ring-shaped rubber body may have the shape of a truncated cone, the outer end in a radial direction being connected to the second support body 26, and the inner end in a radial direction being connected to the first support body 25. The spring element 27 may be connected to the first and second support elements 25, 26 by vulcanizing.

The second support element 26 includes a first housing section 28 which surrounds the axis of the bearing system 29 in ring-shaped form. The spring element 27 is fixed to the end of the first housing section 28, which faces the first support element 25.

A working chamber 30 and a compensating chamber 31 are formed in the space bounded by the first housing section 28. The working chamber 30 is separated from compensating chamber 31 by a barrier 32 which is supported by a support element 33, and working chamber 30 and compensating chamber 31 are filled with damping fluid and connected to each other via a damping channel 34 in a fluid-conducting manner.

The working chamber 30 is bounded by the first support body 25, the first housing section 28, the barrier 32 and the support element 33. The compensating chamber 31 is bounded by the sides of the barrier 32 and supporting element 33 turned away from working chamber 30, as well as diaphragm 35 formed as a rolling diaphragm.

During a relative movement between the first support element 25 and the second support element 26, the volume of the working chamber 30, completely filled with damping fluid, is changed, so that the damping fluid is moved through damping channel 34 between working chamber 30 and compensating chamber 31. The elastic diaphragm 35 provides for the compensating chamber 31, completely filled with damping fluid, to be able to accept a variable volume of damping fluid. At the initiation of vibrations in bearing system 24, a reduction of vibrations is attained by the damping fluid taken up by damping channel 34 being likewise vibrating when the characteristic frequency of the damping fluid is excited in the damping channel 34.

At the second support element 26, a second housing section 36 is provided, which circularly encloses the first support element 25, at a clearance "I". On the first support structure supporting element 25, a stop 37 is formed. On the left side of FIG. 9, the supporting element 25 is illustrated with the stop 37 in partial cross-section extending in the direction of driving. On the right side of FIG. 9, the same parts are shown in a partial cross-section extending transversely to the direction of driving.

The stop 37, 37' is provided with an elastic material 38, which is preferably formed as a rubber bumper.

During relative movements which are smaller than the clearance I, the stop 37 does not influence the vibrating behavior of bearing system 24. However, as the amplitudes of the movements increase, bumper 38 contacts the second housing section 36 and is deformed thereby. As illustrated in FIG. 9, bumper 38 is formed in different thicknesses in the X and Y directions, so that, in these directions, different soft impacts are produced. In the example embodiment illustrated in FIG. 9, bumper 38 is thicker than bumper 38', which achieves a softer impact in the X direction than in the Y direction.

Figure 11:
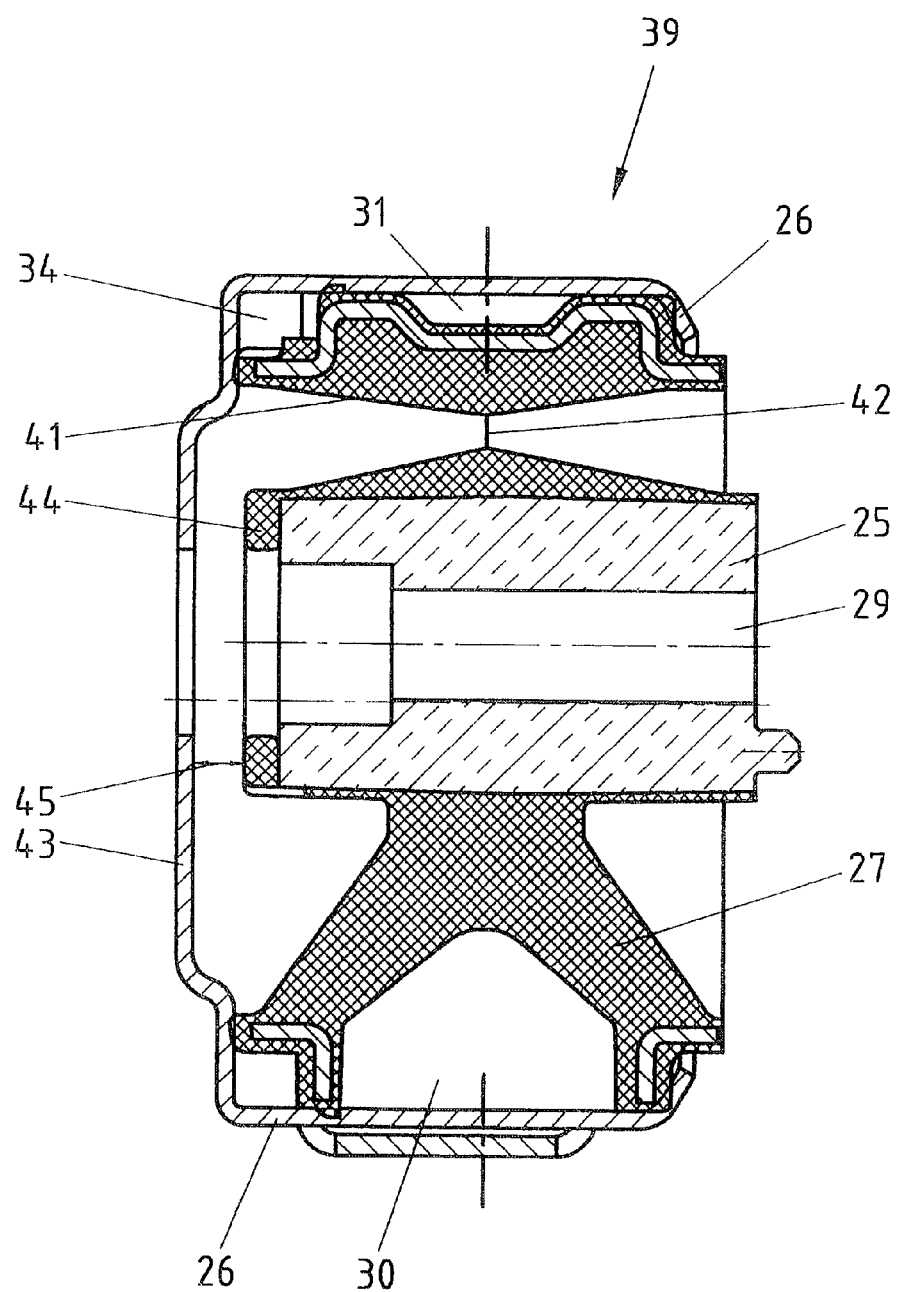
FIG. 11 is a cross-sectional view of the bearing element illustrated in FIG. 10 taken along the line D—D.

FIGS. 10 and 11 illustrate a bearing 39, which, according to the present invention, may be used as first and/or third bearing element 1, 3. Bearing 39 may be a hydraulically damping sleeve bearing (hydraulic sleeve). Parts having equal functions as in bearing 24 described above are denoted by the same reference numerals.

The bearing system 39 includes a first support element 25 and a second support element 26 movable with respect to the first support element 25. The bearing system 39 may be connected, via the first and second support elements 25, 26 made of metal, to the engine 5 or the transmission 6 and to the chassis of a motor vehicle. The second supporting element 26, encloses the first supporting element 25 in ring-shaped form. Between the first support element 25 and the second support element 26, a spring element 27 is provided, which is formed as a rubber body. A working chamber 30 and a compensating chamber 31 are formed in the space formed between the first and second supporting element 25, 26. The working chamber 30 is bounded by spring element 27 and second supporting element 26. The compensating chamber 31 is bounded by the second supporting element 26 and an elastic partition 40. Working chamber 30 and compensating chamber 31 are filled with damping fluid and connected to each other via a damping channel 34 in a fluid-conducting manner.

During a relative movement between the first and the second support element 25, 26, the volume of the working chamber 30, completely filled with damping fluid, is changed, so that the damping fluid is moved through damping channel 34 between working chamber 30 and compensating chamber 31. The elastic partition 40 provides for the compensating chamber 31, completely filled with damping fluid, to accept a variable volume of damping fluid.

Bearing 39 includes a rebound stop 41 which functions transversely to the bearing axis. It is formed by an elastic bumper formed on the second supporting element 26. The rebound stop 41 is separated from the first supporting element 25 by a gap 42. On the side of the first supporting element 25 opposite the rebound stop, an elastic layer is also arranged. Furthermore, the second supporting element 26 includes a third housing section 43, pointing radially inwardly, which defines an impact surface for an axial stop 44 formed on the first supporting element 25. The axial stop 44, functioning in a direction transverse to that of the vehicle, is separated from the third housing section 43 by a gap 45. In addition, the axial stop 44 is provided with an elastic bumper made of elastomer. As illustrated in FIG. 10, the first supporting element 25 is additionally provided with torque support bumpers 46, which are positioned transversely to bearing axis 29 and offset to the rebound stop 41. The torque, support bumper prevents the formation of noises which could otherwise occur from a contact of the first and second supporting elements 25, 26.

What is claimed is:

1. A bearing system for an engine-transmission unit arranged transversely in a body of a motor vehicle, the engine-transmission unit including an engine and a transmission, comprising:

a first bearing element arranged between the engine and the body;

a second bearing element arranged between the body and one of the engine and the transmission; and a third bearing element arranged between the transmission and the body;

wherein the second bearing element is formed and positioned at the body and the one of the engine and the transmission without any movable intermediate element so that torque forces are transmitted from the engine-transmission unit to the body substantially in a longitudinal direction; and wherein the second bearing element includes a first spring rate in a first area of small deflections in the longitudinal direction of the motor vehicle about a static position of rest at standstill of the engine and includes a second spring rate in a second area of larger deflections in the longitudinal direction of the motor vehicle, the second area adjoining the first area, the second spring rate being greater than the first spring rate.

2. The bearing system according to claim 1, wherein the second bearing element is arranged below one of the first bearing element and the third bearing element.

3. The bearing system according to claim 2, wherein the second bearing element is arranged substantially vertically below the one of the first bearing element and the third bearing element.

4. The bearing system according to claim 1, wherein the third bearing element is arranged one of on and adjacent to a torque-roll axis.

5. The bearing system according to claim 4, wherein the first bearing element is arranged above the torque-roll axis.

6. The bearing system according to claim 1, wherein the second bearing element includes a first anchoring part and a second anchoring part, the second anchoring part being movable relative to the first anchoring part, at least one spring element being arranged between the first anchoring part and the second anchoring part.

7. The bearing system according to claim 6, wherein the second bearing element includes a sleeve bearing, the second anchoring part enclosing the first anchoring part in the sleeve bearing at a radial distance.

8. The bearing system according to claim 1, wherein at least one of the first bearing element, the second bearing element and the third bearing element is fastened to a respective location having a high stiffness.

9. The bearing system according to claim 1, wherein at least one of the first bearing element, the second bearing element and the third bearing element is fastened to a respective location of a chassis of the motor vehicle.

10. The bearing system according to claim 1, wherein the bearing system includes exactly three bearing elements, the engine-transmission unit being fastened to the vehicle body by the exactly three bearing elements.

11. The bearing system according to claim 1, wherein the first bearing element is arranged one of at and adjacent to an upper end of the engine-transmission unit and wherein the second bearing element is arranged one of at and adjacent to a lower end of the engine-transmission unit.

12. The bearing system according to claim 1, wherein the first bearing element and the third bearing element are arranged so that a center of gravity of the engine-transmission unit is arranged below a line coinciding with the first bearing element and the third bearing element.

13. A bearing system for an engine-transmission unit arranged transversely in a body of a motor vehicle, the engine-transmission unit including an engine and a transmission, comprising:

a first bearing element arranged between the engine and the body;

a second bearing element arranged between the body and one of the engine and the transmission, wherein the second bearing element includes a first anchoring part and a second anchoring part, the second anchoring part being movable relative to the first anchoring part, at least one spring element being arranged between the first anchoring part and the second anchoring part, and wherein the second bearing element includes a first chamber filled with a damping fluid and bounded by a first chamber wall, the second bearing element including a second chamber separate from the first chamber and bounded by a second chamber wall, the first chamber being connected to the second chamber via a passage, a volume of the first chamber being changeable in response to a relative movement of the first anchoring part and the second anchoring part so that the damping fluid is moved into the passage between the first chamber and the second chamber; and a third bearing element arranged between the transmission and the body;

wherein the second bearing element is formed and positioned at the body and the one of the engine and the transmission without any movable intermediate element so that torque forces are transmitted from the engine-transmission unit to the body substantially in a longitudinal direction; and wherein the second bearing element includes a first spring rate in a first area of small deflections in the longitudinal direction of the motor vehicle about a static position of rest at standstill of the engine and includes a second spring rate in a second area of larger deflections in the longitudinal direction of the motor vehicle, the second area adjoining the first area, the second spring rate being greater than the first spring rate.

14. The bearing system according to claim 13, wherein at least one of the first chamber wall and the second chamber wall defines an elastic partition;

wherein the elastic partition is arranged so that in response to the relative movement between the first anchoring part and the second anchoring part in the first area, the volume of the first chamber does not change; and wherein the elastic partition is arranged so that in response to the relative movement between the first anchoring part and the second anchoring part in the second area, the volume of the first chamber changes.

15. The bearing system according to claim 13, wherein at least one of the first chamber wall and the second chamber wall is arranged with a clearance to the spring element in the static position of rest at standstill of the engine.

16. The bearing system according to claim 13, further comprising an elastic bumper provided in at least one of the first chamber and the second chamber, the elastic bumper limiting relative movement of the first anchoring part and the second anchoring part.

17. A bearing system for an engine-transmission unit having an engine and a transmission and arranged transversely in a body of a motor vehicle, comprising:

a first bearing element arranged between the engine and the body;

a second bearing element arranged between the engine or the transmission and the body; and a third bearing element arranged between the transmission and the body, the second bearing element being formed and positioned at the engine or the transmission and the body in such a way that torque forces supported by the second bearing element of the engine-transmission unit are introduced to the body substantially in the vehicle longitudinal direction and the second bearing element including a first spring rate in a first area of small deflections in the longitudinal direction of the vehicle about a static position of rest at standstill of the engine and includes a second spring rate in a second area, which adjoins the first area, of larger deflections in the longitudinal direction of the vehicle, the second spring rate being greater than the first spring rate, the second bearing element having a first anchoring part and a second anchoring part movable relative to the former; at least one spring element acting between the first and the second anchoring part, wherein the second bearing element is positioned at the engine or the transmission and the vehicle body without a movable intermediate element, and wherein the second bearing element has a first chamber filled with damping fluid and bounded by a first chamber partition and a second camber, separate from the first chamber and bounded by a second chamber partition, which is connected to the first chamber via a passage, in the case of relative movement of the first and the second anchoring part in the region of large deflections, the volume of the first chamber being changed, so that damping fluid is moved into the passage between the first chamber and the second chamber, and wherein the first and/or the second chamber partition are formed by an elastic partition wall, positioned in such a way that, in the case of relative movement of the first and the second anchoring part in the region of small deflections about the static position of rest at stillstand of the engine, the volume of chamber is not changed.

18. The bearing system as recited in claim 17, wherein the second bearing element is positioned essentially vertically below the first or third bearing element.

19. The bearing system as recited in claim 17, wherein the third bearing element is positioned adjacent to or on the torque-roll axis.

20. The bearing system as recited in claim 17, wherein the first bearing element is positioned above the torque-roll axis.

21. The bearing system as recited in claim 17, wherein the second bearing element is a sleeve bearing in which the second anchoring part encloses the first anchoring part at a radial distance.

22. The bearing system as recited in claim 17, wherein the first and/or the second chamber wall is positioned at a clearance to the spring element in the static position of rest at standstill of the engine.

23. The bearing system as recited in claim 17, wherein a elastic bumper is provided in the first chamber and/or the second chamber which bounds the relative motion between the firs and the second anchoring part.

24. The bearing system as recited in claim 17, wherein the first, second and/or third bearing element are fastened directly to body locations having great rigidity, in the region of chassis fastening.

25. The bearing system as recited in claim 17, wherein the engine-transmission unit is fixed to the vehicle body using exactly three bearing elements.

26. The bearing system as recited in claim 17, wherein the first bearing element is positioned at or adjacent to the upper end of the engine-transmission unit, and the second bearing element is positioned at or adjacent to the lower end of the engine-transmission unit.

27. The bearing system as recited in claim 17, wherein the first bearing element and the third bearing element are positioned so that the center of gravity of the engine-transmission unit lies below an imaginary connecting line between the first bearing element and the third bearing element.

* * * * *

UNITED STATES PATENT AND TRADEMARK OFFICE
CERTIFICATE OF CORRECTION

PATENT NO. : 6,540,042 B2
DATED : April 1, 2003
INVENTOR(S) : Hamaekers et al.

It is certified that error appears in the above-identified patent and that said Letters Patent is hereby corrected as shown below:

Column 11,
Line 22, change "the firs and" to -- the first and --;

Column 12,
Line 3, change "rigidity, in" to -- rigidity, particularly in --.

Signed and Sealed this

Thirteenth Day of September, 2005

JON W. DUDAS
*Director of the United States Patent and Trademark Office*